Oct. 30, 1962 H. HUBBELL, JR 3,061,083
PROTECTIVE COVERING FOR OPEN SIDE OF WALL OUTLET
BOXES AND THE LIKE DURING BUILDING CONSTRUCTION
Filed Sept. 29, 1959 2 Sheets-Sheet 1
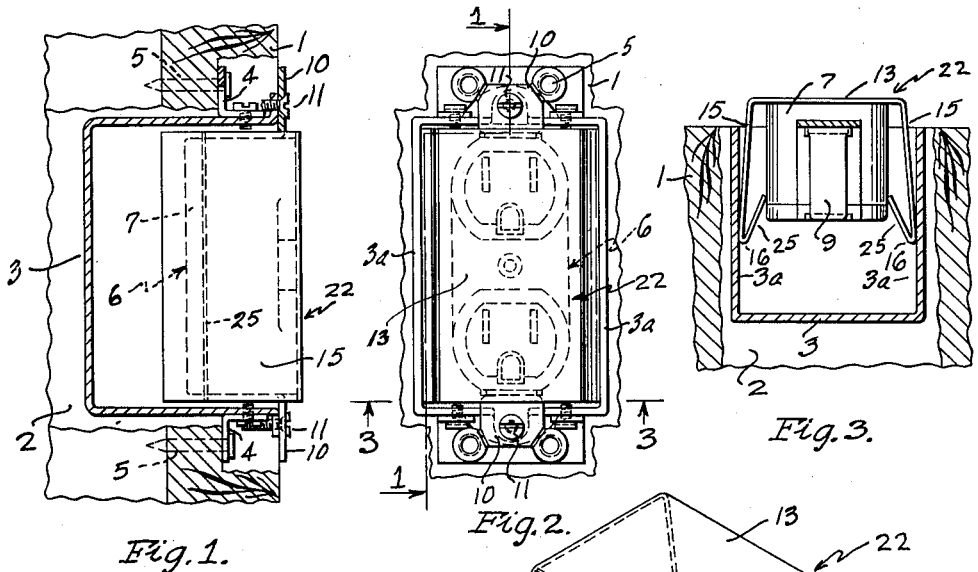
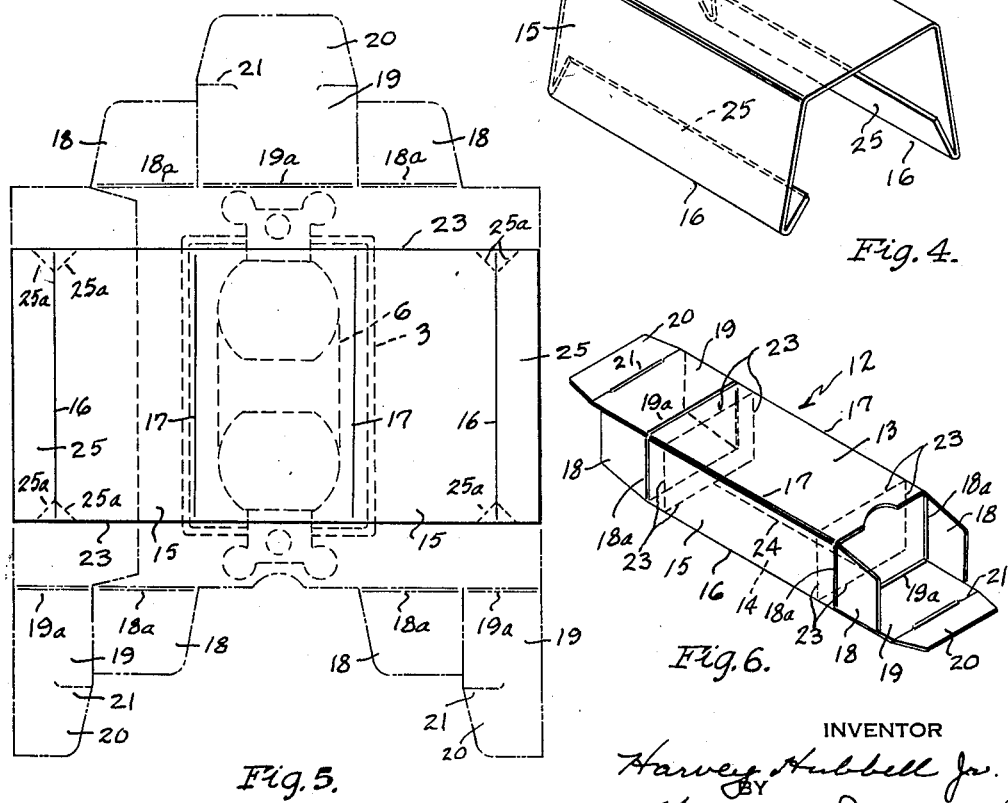
INVENTOR
Harvey Hubbell Jr.
BY
Wooster, Davis & Cifelli
ATTORNEYS

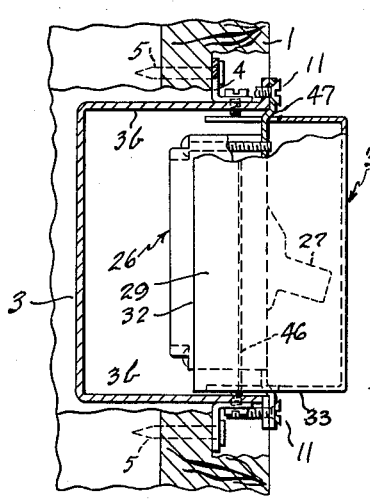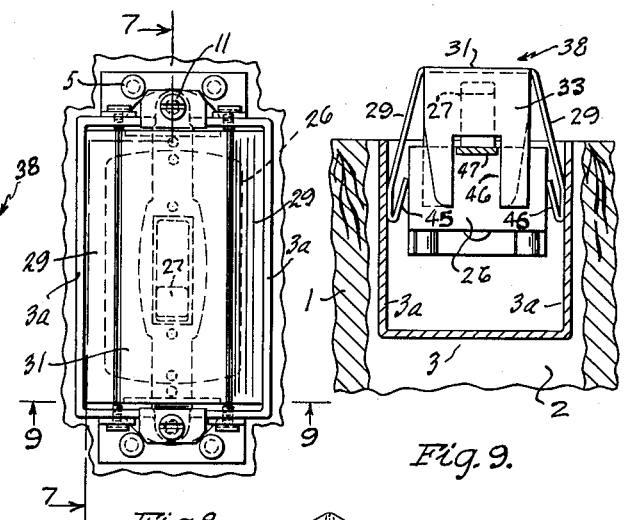

3,061,083
PROTECTIVE COVERING FOR OPEN SIDE OF WALL OUTLET BOXES AND THE LIKE DURING BUILDING CONSTRUCTION

Harvey Hubbell, Jr., Veradale, Wash., assignor to Harvey Hubbell, Incorporated, Bridgeport, Conn., a corporation of Connecticut
Filed Sept. 29, 1959, Ser. No. 843,111
4 Claims. (Cl. 206—46)

This invention relates to the protection of electric fixtures after they have been mounted in wall boxes in a house wiring system. It is common practice in building operations for the electrician to install the electric wiring and the wall boxes, and also to mount the electric fixtures such as outlet receptacles and switches in these boxes and connect them to the wiring, before the building operations such as the main plastering, the finishing plastering coat, papering, painting and other operations are completed. The front of the open wall box with the electric fixture in it may be thus left exposed for some time before the finishing wall or face plate can be applied, with resultant liability of plaster or other objectionable material getting into the box or electric fixture, or the fixture otherwise being marred or injured.

It is an object of this invention to provide an effective closure and protective covering for the open side of the wall box and the fixture during the subsequent building operations after the wall box and fixture are installed.

It is also an object to provide the cardboard box in which the electric fixture is sold, of a novel construction whereby after the fixture is removed this box may be readily converted into the protective covering for the wall box and fixture.

It is another object to provide such a protective covering which may be applied to the wall box and fixture by merely inserting it into the open side of the wall box over the fixture.

With the foregoing and other objects in view, I have devised the construction illustrated in the accompanying drawings forming a part of this specification. It is, however, to be understood the invention is not limited to the specific details of construction and arrangement shown, but may embody various changes and modifications within the scope of the invention.

In these drawings:

FIG. 1 is a longitudinal section through a wall box with the electric fixture therein and this device shown in side elevation, the section being substantially on line 1—1 of FIG. 2;

FIG. 2 is a front view thereof;

FIG. 3 is a transverse section substantially on line 3—3 of FIG. 2;

FIG. 4 is a perspective view of this cover device showing it in condition for insertion in the wall box;

FIG. 5 is a view showing the box blank from which the box and this protective covering is formed;

FIG. 6 is a perspective view of the box;

FIG. 7 is a section similar to FIG. 1 but showing a different form of electric fixture in a wall box, and a modified protective covering for use with this type of fixture, the section being substantially on line 7—7 of FIG. 8;

FIG. 8 is a front view thereof;

FIG. 9 is a transverse section substantially on line 9—9 of FIG. 8;

FIG. 10 is a perspective view of this form of protective covering;

FIG. 11 is a view of the blank showing how the box and this covering are formed, and FIG. 12 is a perspective view of the box from which this covering is produced.

Referring first to the form of FIGS. 1 to 6, a building wall is indicated at 1 provided with a recess or opening 2 in which is mounted the standard type of sheet metal wall box 3 secured in a wall by the usual angularly shaped ears 4 at its opposite ends and the nails 5 passing through openings in these ears. Mounted in the box is an electric fixture, in this case a duplex outlet receptacle 6 comprising an insulating body 7 in which are mounted the usual receptacle contacts (not shown) to which lead the inlet slots 8 in the front wall for insertion of the blades of an attachment plug cap for taking current from the receptacle contacts connected to the usual house wiring system (not shown). This receptacle is mounted in the wall box by means of a yoke 9 having outwardly extending ears 10 at its opposite ends by means of which it is mounted in the wall box by the screws 11.

As previously indicated, in the normal building operations this and other fixtures, such, for example, as switches, are mounted in the wall boxes, and the electric wiring is installed so that these fixtures may be connected to the wiring, and this is done before the walls are finished. It may be done before the finishing plaster, paper or other finish is put on the wall, with the result that the box may be left open at the front and the fixture exposed for a considerable time before the finishing cover plate may be applied, which is not applied until after the wall finishes are finished. During these operations and during this time, plaster may get into the wall box and the fixture, or other dirt and foreign matter, with possible resulting injury to the fixture and necessitating cleaning out the wall box after the wall finishing operations. The device of this invention is designed to provide a simple and effective means of covering the open side of the wall box and the fixtures during these finishing operations, and up to the time the building operations are completed when the finishing cover or face plates may be applied.

These electric fixtures are usually sold in individual cardboard boxes, such as that shown at 12 in FIG. 6, comprising a body portion including a longitudinal front panel 13, a rear panel 14, and side panels 15, connected by longitudinal fodled edges 16 and 17. They are open at their opposite ends and closed by folding in side tabs or flaps 18 connected to the body portion by folding lines 18a and an end tab or flap 19 including a tuck-in free edge tab or flap 20 hinged to the end tab 19 by a fold 21. Flap 19 is connected to the body portion by folding line 19a. This box is long enough to enclose the electrical fixture including the mounting ears 10 when the tabs or flaps 18 and 19 are folded in to close the ends of the box, the two side tabs 18 being first folded in over the open end, then the end tab 19 folded over these tabs, and the tuck-in portion 20 inserted in the box in the usual manner to retain these folded tabs in place. The corresponding folding edge lines 16 and 17 between the body panels are shown in FIG. 5 on the blank cardboard which is cut for the box and folded and assembled.

As the box, when assembled as shown in FIG. 6, is longer than the length of the open compartment in the wall box 3, the opposite end portions are removed to provide the protective covering shown in FIG. 4. For this purpose the box is provided with scored or perforated tear-off lines 23 about the periphery of its body panels, spaced the proper distance from the end of the body of the box so that the distance between the lines 23 at the opposite ends of the box is substantially equal to the longitudinal length of the opening or compartment in the wall box 3. One body panel, in the present case the rear panel 14, is also provided with a score or tear line 24 extending longitudinally thereof between the peripheral tear lines 23 at the opposite ends of the box, the tear line 24 being preferably substantially at the midwidth of the rear panel.

The electric fixture, in this case the duplex receptacle 6, is enclosed in and sold in this box in the usual manner, the box having the usual printing identifying the fixture, its use and so forth. After this fixture is removed from the box, the opposite end portions, including the folding tabs 18 and 19, are torn off on the tear lines 23, leaving an intermediate body portion comprising the body panels 13, 14 and 15. Then this body portion is also torn along the tear line 24, leaving separated side panels 15 connected by the intermediate front panel 13, as shown in FIG. 4. This member now comprises a top body panel 13 and side panels 15, and the bottom panel 14 is now separated into two inwardly folded tuck-in longitudinal edge panels 25, as shown in FIG. 4. These can be folded inwardly about the side edges 16 which are the folded connections between the bottom panel and the side panels 15, as shown in FIG. 4. Now the side panels 15, together with these tuck-in panels 25, may be slid into the wall box 3 through the front opening thereof and between the side walls 3a of this box and the sides of the body 7 of the electric fixture, in this case the duplex receptacle, as shown in FIG. 3. The resiliency of the carboard material of the member 22 causes these tuck-in panels 25 to tend to swing inwardly, with their free edges against the side of the fixture body 7, as shown in FIG. 3, and retain the side panels 15 against the sides of the wall box, forming sufficient friction to effectively retain this protective covering 22 in the wall box and over the front of the electric fixture, thus closing the open side of the wall box against entrance of plaster and other dirt or objectionable material during the further building and finishing operations after the electric fixture has been installed, this covering effectively protecting the electric fixture, as shown in FIGS. 1, 2 and 3.

In FIG. 5 the broken dot and dash lines indicate the outline of the blank and tabs or flaps for assembling and folding into the box, while the full lines represent the protecting member of FIG. 4 formed by tearing off the end portions and dividing longitudinally along the longitudinal tear line 24. There may also be inclined or diagonal tear lines 25a at the corners or ends of the fold line 16 between the panels 15 and 25, as shown in FIG. 5, whereby these corners may be torn off to provide inclined edges at these corners to facilitate insertion of these panels into the wall box between the walls of this box and the fixture.

In FIGS. 7 to 12 is shown a modified form of this protective covering adapted for use with a different form of electric fixture, in this case an electric switch, instead of the outlet receptacle as shown in FIGS. 1, 2 and 3. This device is shown in FIGS. 7, 8 and 9, the wall box 3 being the same as that shown in FIGS. 1, 2 and 3. In this is mounted the electric fixture, in this case an electric switch 26, provided with an operating handle 27 projecting from the front of the switch and the front of the wall box. It will be evident that as this projects from the front of the box it is liable to additional injury in addition to those involved in the receptacle of FIGS. 1, 2 and 3. The cardboard box in which this switch is sold is shown in perspective at 28, FIG. 12. It comprises the front, rear and side panels 29, 30 and 31 respectively, connected by the bent or folded edges 32, and at its opposite ends is closed by the folding side tabs or flaps 33 and 34 and end flaps or tabs 35, including the tuck-in tab 36 connected to 35 by the fold line 37. Tabs 33 are connected to the body portion or panels by fold line 33a, while the tabs or flaps 34 are connected to the body portion or panels by the fold 34a.

The protective member formed from this box is shown in perspective at 38, FIG. 10. This is formed by removing the greater part of the opposite end portions of the box of FIG. 12 about the peripheral tear lines formed by scoring or perforating indicated at 39 in the front and back panels and the similar perforated tear lines 40 in the side panel 31. In this case there is no tear line across the side panel 31 under the folding side tabs 33. Thus the tabs are not torn off with the rest of the end portions in forming the protective element 38. After the switch is removed from the box, the portions outwardly of the tear lines 39 and 40 are torn off, including along the short tear lines 41. This removes all of the end portions beyond the tear lines 39 and 40, except the folding side tabs 33. The opposite side panel 31 to the tabs 33 is provided with a longitudinal intermediate tear line 42 extending between the transverse tear lines 40. The folding tabs 33 are also provided with tear lines 43 and 44 in the shape of a rectangle extending inwardly from its free end edge. After tearing off the end portions on the tear lines 39, 40 and 41, the side panel 31 is separated into two tuck-in longitudinal panels 45 by tearing along the line 42, and the portions between the tear lines 43 and 44 are torn out of the end tabs 33 forming the notches 46 in these end tabs.

This protective covering is now ready for use by insertion in the wall box over the electric fixture, in this case the switch, the same as described for the protective cover 22 in FIGS. 1, 2 and 3. In this case, the tuck-in body panels 45 with the side panels 29 are inserted in the wall box between the sides 3a of this box and the sides of the body 26 of the switch, as shown in FIG. 9, enclosing the outwardly projecting switch operating handle 27, as indicated, and otherwise closing the front opening of the wall box and covering and protecting the switch, the same as the device of FIGS. 1 to 3 covers and protects the outlet receptacle. However, in this case the notched end tabs or flaps 33 are passed down into the wall box between its end walls 3b and the ends of the body 26 of the switch, as shown in FIGS. 7 and 9, this being permitted by the notch 46 straddling the mounting ears 47 of the mounting yoke for the switch. Thus in this case not only are the front and sides of the electric fixture and the opening in the wall box covered, but the ends between the front panel 29 and the wall are enclosed and protected by the end tabs or flaps 33. The tuck-in longitudinal panels 45, due to the resiliency of the material from which the box is made, have the same frictional gripping effect between the sides 3a of the wall box and the sides of the body of the electric fixture to effectively retain this protective covering in place, as described in connection with FIGS. 1, 2 and 3. If preferred, the notch 46 may be provided in the tab 33 when the blank for the box is cut so it will not be necessary to tear out any portion of the tab to provide this notch.

In FIG. 11 the broken dot and dash lines indicate the outline and tabs or flaps of the blank for folding and assembling the box, while the full lines represent the protecting member of FIG. 10 formed after the end portions have been torn off and the side panel separated by tearing along the longitudinal tear line 42.

Thus with this device, the containing box in which the electric fixture is enclosed and sold is readily converted into a protective covering for the electric fixture, and its enclosing wall box, between the times of their installation and the other building and finishing operations are completed, to provide an effective protection for these elements, and the operations of producing the protective covering member from this box comprise simple operations of tearing off end portions of the box on previously prepared scored or perforated tear lines, separating the body portions along one longitudinal tear line, and then merely inserting the opposite fold-in edges of the resulting intermediate body portion into the outlet box between the side walls of this box and the sides of the body of the fixture. This does away with the necessity of providing a separate protecting means and gives double value to the box. There may also be inclined tear lines 48 (FIG. 11) at the corners or ends of the fold lines 32 between the panels 29 and 46 whereby these corners may be removed to provide inclined corners at the ends of these panels to facilitate their insertion into the wall box between the sides of this box and the electrical fixture.

Having thus set forth the nature of my invention, I claim:

1. A protective covering for the open side of a wall box in a house wiring system in which an electric fixture has been mounted, said covering comprising a pair of laterally spaced side panels and an intermediate panel connected to the side panels by folded longitudinal edges, and an upwardly and inwardly extending tuck-in panel at the free edge of each of the side panels connected thereto by longitudinal folded edges and adapted to be inserted with their connected side panels in the wall box through the open front side thereof between the sides of the wall box and the fixture with the intermediate panel covering the front side of the fixture, and the tuck-in panels cooperating with the fixture to retain the intermediate panel in position over the fixture.

2. The protective covering according to claim 1 in which there is an inwardly folded flap connected to each of the opposite ends of the intermediate panel located between the side panels and provided with an open notch extending inwardly from its free edge opposite the connected panel adapted to seat over the mounting bridge of the electric fixture.

3. An electric fixture mounted in an open-sided wall box in a house wiring system, a temporary removable protective covering for the fixture and open side of the box comprising a pair of laterally spaced side panels and an intermediate panel connected to the side panels by folded longitudinal edges, an upwardly and inwardly extending tuck-in panel at the free edge of each of the side panels connected thereto by longitudinal folded edges, said tuck-in panels with their connected side panels inserted in the wall box through the open front side thereof between the sides of the wall box and the fixture with the intermediate panel covering the front side of the fixture, and the side panels and tuck-in panels cooperating with the sides of the wall box and fixture to retain the protective covering in position over the fixture.

4. A cardboard box for an electric fixture having a body and mounting ears extending away from its opposite ends which is adapted to be mounted in an open-sided wall box in a house wiring system, said box being tubular and rectangular in cross section, having a flat front, rear and side panels connected by folded longitudinal edges, and including folding end flaps to close the open opposite ends of the box; said box being convertible to a protective covering for the open side of a wall box in a house wiring system in which the electric fixture is mounted; said box including a pair of spaced parallel straight transversely extending tear lines that are longitudinally spaced apart a distance substantially equal to the length of the body of the electric fixture, each of said tear lines extending completely through said front, rear and side panels whereby end portions of the box may be removed at said tear lines to leave a tubular intermediate body portion; and one of the body panels being provided with a longitudinally extending tear line that extends between and connects said pair of tear lines and is disposed transversely intermediate the folded edges of said one panel which connect it to adjacent body panels whereby said one panel may be separated at the longitudinally extending tear line to form two separate tuck-in panels, each substantially half the width of said one body panel and connected at the longitudinal edge of the adjacent body panel and adapted to be inserted with the adjacent body panel into the wall box between the electric fixture body and a side of the wall box and by the inherent resilient action of the material the tuck-in panels and their connected body panels cooperate with the sides of the wall box and electric fixture body to retain the body panel opposite to said one body panel in position over the front of the electric fixture body.

References Cited in the file of this patent

UNITED STATES PATENTS

| | | |
|---|---|---|
| 2,073,272 | Wellman | Mar. 9, 1937 |
| 2,398,901 | West | Apr. 23, 1946 |
| 2,666,546 | Reilly | Jan. 19, 1954 |
| 2,815,144 | Kullander | Dec. 3, 1957 |